No. 762,653. Patented June 14, 1904.

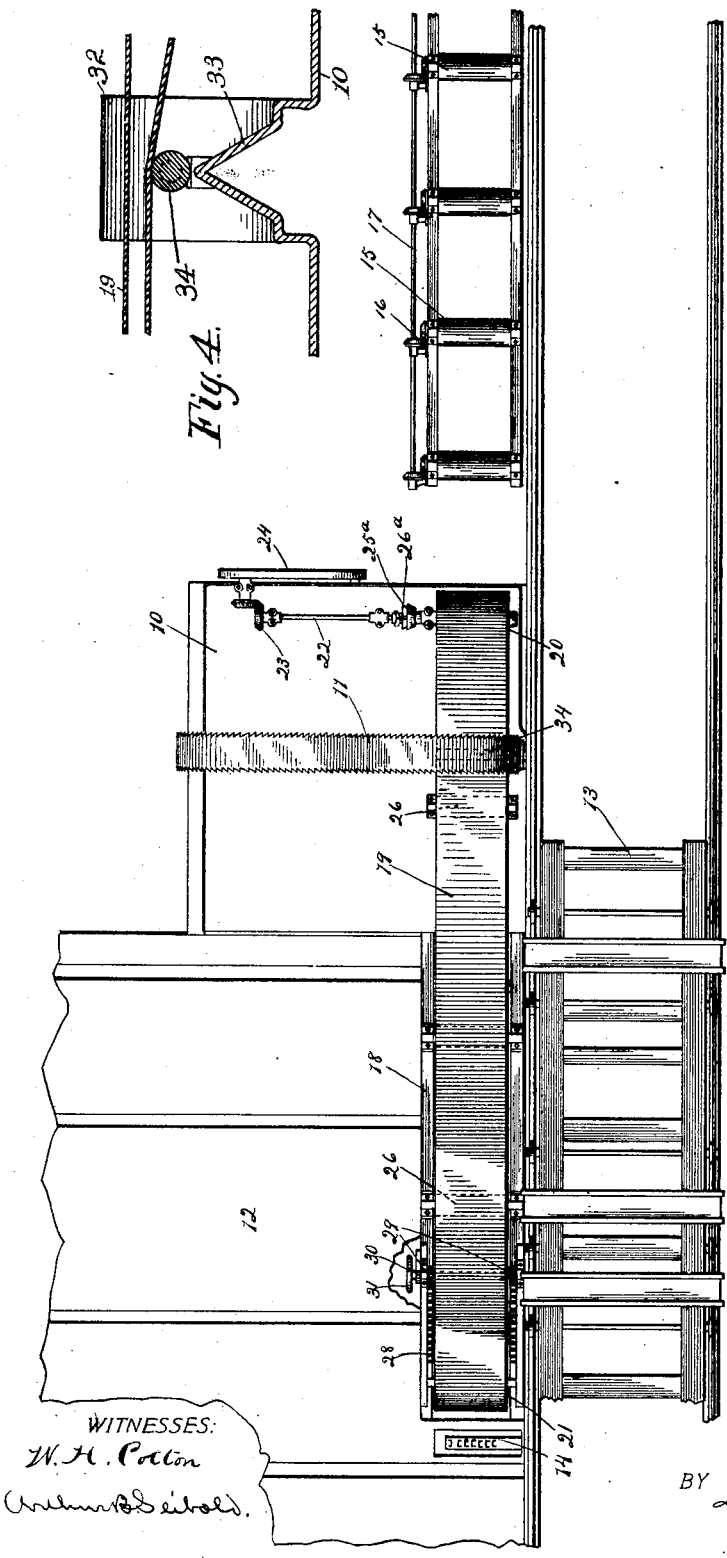

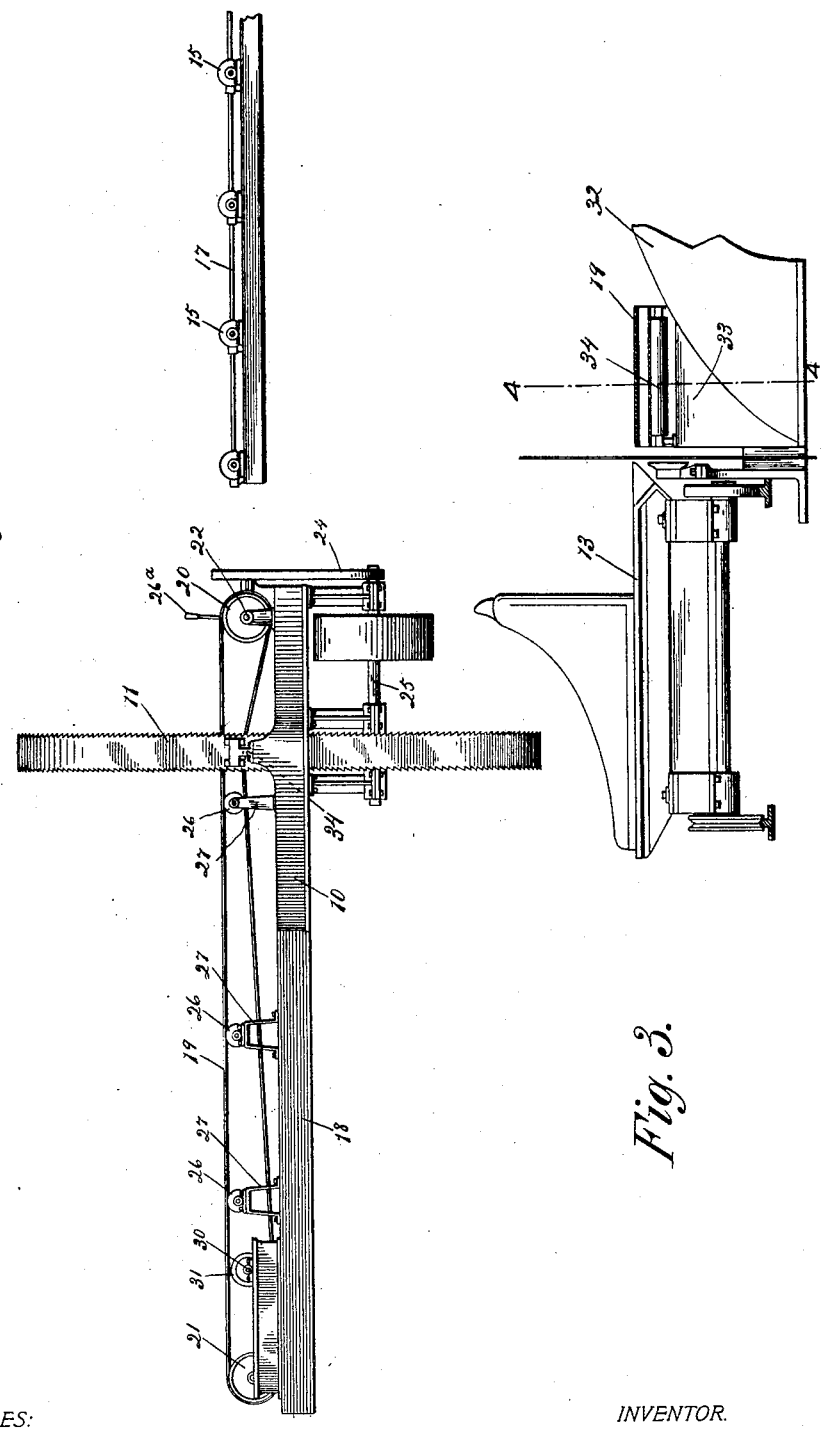

UNITED STATES PATENT OFFICE.

DE WITT C. PRESCOTT, OF CHICAGO, ILLINOIS.

CONVEYER FOR BAND-SAW MILLS.

SPECIFICATION forming part of Letters Patent No. 762,653, dated June 14, 1904.

Application filed May 13, 1902. Serial No. 107,201. (No model.)

*To all whom it may concern:*

Be it known that I, DE WITT C. PRESCOTT, a citizen of the United States, and a resident of Chicago, county of Cook, and State of Illinois, have invented certain new and useful Improvements in Conveyers for Band-Saw Mills, of which the following is a specification and which are illustrated in the accompanying drawings, forming a part thereof.

This invention relates to improvements in lumber-conveyers for sawmills. Sawmill plants employing a circular saw or an ordinary single-cutting band-saw are usually provided with a conveyer comprising a series of driven rollers located back of the saw in such position that a board cut from the log on the advance of the sawmill-carriage will fall thereon and be conveyed away before the next board is sawed.

In sawing with a double-cutting saw inasmuch as a board is taken off the log on the backward as well as the advance movement of the carriage it is necessary to provide supplemental means for conveying away the boards removed while the carriage is returning.

The present invention has for its object to secure such means; and it consists in providing, in addition to the usual conveyer located at the back of the saw, an endless belt located at the opposite side of the saw and designed to transport the boards falling thereon to the first-mentioned conveyer.

The invention further consists of the combination and arrangement of parts hereinafter particularly described, specifically designated in the claims, and illustrated in the accompanying drawings, in which—

Figure 1 is a plan of the sawmill plant provided with the usual live roller conveyer and illustrating the arrangement and location of the auxiliary or supplemental conveyer of the present invention. Fig. 2 is a front elevation of a band-saw mill and the conveyers shown in Fig. 1, and Fig. 3 relates to details of construction. Fig. 4 is a detail section on the line 4 4 of Fig. 3.

I have shown in the drawings a sawmill plant comprising a band-saw mill 10, having a double-cutting saw 11, log-deck 12, reciprocating carriage 13, log-turner 14, and the usual lumber-conveyer 15, consisting of a series of rollers, shown as being driven through the medium of bevel-gears 16 on a shaft 17 and located back of the saw—that is to say, at the side of the saw opposite to the log-turner 14 and so disposed with relation to the saw and the path of the sawmill-carriage that the boards cut from the log on the advance of the carriage will fall thereon and be conveyed away to the desired place. The parts heretofore described are of the usual and ordinary construction.

When a double-cutting saw is employed, as in the present instance, it is essential that means be provided for removing the lumber cut while the sawmill-carriage is moving backward, as well as when advancing. To this end I propose to employ an auxiliary endless-belt conveyer and locate the same between the conveyer 15 and the log-turner 14, driving the belt in such direction that the boards cut from the log or cant on the recession of the carriage 13 will fall thereon and be transported to the conveyer 15 to be moved by the latter in the same manner as the lumber cut on the advance of the carriage.

In the construction illustrated the front end of the log-deck between the log-turner 14 and the frame of the band-saw mill is cut away, as at 18, to provide a place for an endless belt 19, the upper stretch of which lies slightly below the head-block base of the sawmill-carriage, as illustrated in Fig. 3, in order to clear and not be in the way of that portion of the log or cant extending beyond the head-blocks and about to be sawed. This belt extends from the log-turner 14 parallel with the sawmill-carriage track behind the front side of the cutting stretch of the saw to within a short distance of the nearer end of the live roll conveyer 15, being driven by a pulley 20, journaled on the sawmill-frame at the side adjacent to the live roll conveyer 15 and running around a pulley 21, located near the log-turner 14. The driving-pulley is keyed to a shaft 22, to which motion is imparted by bevel-gearing 23 and belt 24, the latter receiving motion from the driving-shaft 25 of the band-saw mill; but should an overhead log-turner be employed then in that case the endless belt may extend nearly the full distance comprised in the entire width of the log-deck.

The belt 19 may be stopped when a log is to be rolled onto the carriage or for other purposes by uncoupling a clutch $25^a$ on the shaft 22 and controlled by a lever $26^a$.

The upper stretch of the belt is supported by idlers 26, journaled in supports 27, bolted to the log-deck frame and the sawmill-frame, and any suitable means may be employed for maintaining the tension of the belt, as by journaling the pulley 21 on a slidable rack-frame 28, engaged and moved by pinions 29 on the shaft 30, having a hand-wheel 31 for turning the same.

In Fig. 3 is shown a portion of the shield or hood 32 for the lower or band-saw driving-wheel and the guard or incline 33 for preventing the accumulation on the sawmill-frame of any sawdust that may be thrown thereon by the saw. In order to enable the lower stretch of the belt to clear this hood and the guard, an idler 34 is located at the apex thereof, as shown in Figs. 2 and 3, and over which the lower stretch of the belt passes.

In addition to moving the boards cut on the recession of the carriage any splinters or pieces that may fall onto the belt may be carried thereby and dumped over the end of the belt into a suitable receptacle provided to receive the same.

The belt 19 is designed to be driven at greater speed than the live roller conveyer 15, in order that each board cut on the backward movement of the carriage will be delivered to the conveyer 15 and carried thereby out of the way of the succeeding board sawed on the next forward stroke of the carriage. This will prevent overlapping on the conveyer 15 of the boards cut at the opposite sides of the saw.

I claim as my invention—

1. In a band-saw mill, in combination, a band-saw and means for driving the same, an inclined guard on the mill-frame, a conveyer for moving boards cut from a log on the advance of a sawmill-carriage, an endless-belt conveyer extending along the log-deck back of the cutting stretch of the saw to near the first-mentioned conveyer and for moving boards cut from the log on the return of the carriage and delivering them to the said conveyer, and a roller journaled on the inclined guard of the mill-frame over which the lower stretch of the belt passes.

2. In a band-saw mill, in combination, a band-saw and means for driving the same, a conveyer for moving boards cut from a log on the advance of a sawmill-carriage, a driving-pulley journaled on the sawmill-frame and adjacent to the conveyer, means for driving the pulley, a belt driven by the pulley and traveling behind the cutting stretch of the saw, a pulley over which the belt passes, a slidable frame on which the pulley is journaled, means for adjusting the latter pulley, a guard on the mill-frame, and a pulley journaled on the guard over which the lower stretch of the belt passes.

3. In combination with a band-saw mill, a conveyer for moving boards cut from a log on the advance of a sawmill-carriage, an endless-belt conveyer located behind the cutting stretch of the saw and extending to the side thereof opposite the first-mentioned conveyer, a guard for the driving-wheel of the band-saw, and an idler supported from the guard and over which the lower stretch of the endless belt passes.

DE WITT C. PRESCOTT.

Witnesses:
ARTHUR B. SEIBOLD,
LOUIS K. GILLSON.